(12) United States Patent
Kitagaki et al.

(10) Patent No.: US 7,154,826 B2
(45) Date of Patent: Dec. 26, 2006

(54) INFORMATION RECORDING METHOD, INFORMATION RECORDING MEDIUM AND INFORMATION RECORDING APPARATUS

(75) Inventors: Naoki Kitagaki, Moriya (JP); Makoto Miyamoto, Moriya (JP); Yuji Yamazaki, Toride (JP)

(73) Assignee: Hitachi Maxell, Ltd., Osaka (JP)

( * ) Notice: Subject to any disclaimer, the term of this patent is extended or adjusted under 35 U.S.C. 154(b) by 28 days.

(21) Appl. No.: 11/176,325

(22) Filed: Jul. 8, 2005

(65) Prior Publication Data

US 2005/0243668 A1 Nov. 3, 2005

Related U.S. Application Data

(63) Continuation of application No. 10/810,568, filed on Mar. 29, 2004.

(30) Foreign Application Priority Data

Apr. 1, 2003 (JP) .............................. 2003-097564

(51) Int. Cl.
*G11B 15/52* (2006.01)

(52) U.S. Cl. ................. 369/47.51; 369/53.27

(58) Field of Classification Search ..................... None
See application file for complete search history.

(56) References Cited

U.S. PATENT DOCUMENTS 5,905,695 A * 5/1999 Kimura ................... 369/13.24

6,956,810 B1 * 10/2005 Noda ....................... 369/275.3

FOREIGN PATENT DOCUMENTS

| JP | A 8-7343 | 1/1996 |
|---|---|---|
| JP | A-09-282661 | 10/1997 |
| JP | A-10-188286 | 7/1998 |

* cited by examiner

*Primary Examiner*—Paul Huber
(74) *Attorney, Agent, or Firm*—Oliff & Berridge, PLC (57) ABSTRACT

An information-recording method and an information-recording medium which make it possible to improve overwrite characteristics in the high speed recording, especially archival overwrite characteristics for overwriting information after retaining the medium in a high temperature environment for a certain period of time, and an information-recording apparatus based on the use of the same are provided. The information-recording method comprises overwriting a random pattern with light-beams having a predetermined recording power and a variety of erasing powers; reproducing the random pattern to determine a minimum value Pb1 and a maximum value Pb2 of the erasing power obtained when the pattern, in which a reproduction jitter exceeds a predetermined threshold value, is erased; determining an optimum erasing power Pb from the minimum value Pb1, the maximum value Pb2, and a relational expression represented by $Pb=\alpha \times Pb1+(1-\alpha) \times Pb2$; and recording the information with the determined optimum erasing power Pb. The value of $\alpha$ is previously recorded on the information-recording medium. The information-recording apparatus has a Pb-calculating control unit which reads the value of $\alpha$ when the optimum erasing power Pb is determined.

4 Claims, 6 Drawing Sheets

INFORMATION RECORDING METHOD, INFORMATION RECORDING MEDIUM AND INFORMATION RECORDING APPARATUS

This is a Continuation of application Ser. No. 10/810,568, filed Mar. 29, 2004. The entire disclosure of the prior application is hereby incorporated by reference herein in its entirety.

BACKGROUND OF THE INVENTION

1. Field of the Invention

The present invention relates to an information-recording method and an information-recording medium which make it possible to record information by being irradiated with a laser beam. In particular, the present invention relates to an information-recording method, an information-recording medium, and an information-recording apparatus which are capable of improving overwrite characteristics in the high speed recording, especially archival overwrite characteristics for overwriting information after retaining the medium in a high temperature environment for a certain period of time.

2. Description of the Related Art

In recent years, the market of read-only optical disks including, for example, DVD-ROM and DVD-Video is expanded. On the other hand, rewritable DVD's including, for example, DVD-RAM, DVD-RW, and DVD+RW are introduced into the market, and the market is expanding for backup media for computers and image-recording media with which VTR may be substituted. Further, in these several years, the demand of the market has increased for the improvement in the access speed and the transfer rate of recordable DVD's.

The phase-change recording system is adopted for recordable DVD media such as DVD-RAM and DVD-RW on which information is recordable and erasable. In the case of the phase-change recording system, the recording is basically performed such that pieces of information of "0" and "1" correspond to the crystal and the amorphous. Recorded "0" and "1" can be detected by radiating the laser beam onto the crystallized portion and the amorphous portion and effecting the reproduction based on the reflected light beam.

In order to bring about the amorphous state at a predetermined position, the heating is effected so that the temperature of the recording layer is not less than the melting point of the recording layer material by radiating a laser beam having a relatively high power. On the other hand, in order to bring about the crystalline state at a predetermined position, the heating is effected so that the temperature of the recording layer is in the vicinity of the crystallization temperature of not more than the melting point of the recording layer material by radiating a laser beam having a relatively low power. By dosing so, it is possible to reversibly change the amorphous state and the crystalline state. When the overwrite recording is performed on the ordinary recordable DVD media, the recording pulse is modulated between the recording laser power and the erasing laser power which is lower than the recording laser power to newly perform the recording while erasing the amorphous marks having been already recorded.

Optical recording media, which realize satisfactory overwrite characteristics, are known, including an optical recording medium as described, for example, in Patent Document 1 in which the overwrite recording is performed with such powers that the recording power level has a value of not more than an optimum recording power and the erasing power level has a value higher than an optimum erasing power.

A drive for the ×2 speed recording (recording speed or velocity: 8.2 m/sec, transfer rate: 22 Mbps) for DVD-RAM may be exemplified in relation to a method for optimizing the erasing power, in which the trial writing is performed for data by using information on the recording power written on a disk to determine the erasing power. In this procedure, the values of the erasing power, which exceed the threshold value of the error rate on the low power side and the high power side, are determined to set the optimum erasing power so that the optimum erasing power is just at the center of the both.

[Patent Document 1] Japanese Patent Application Laid-open No. 08-007343

SUMMARY OF THE INVENTION

In order to improve the transfer rate and the access speed on the recordable DVD medium as described above, it is necessary that the recording speed or the recording velocity is increased to perform the recording and the erasing in a short period of time. However, the recording and erasing characteristic, which arises when information is overwritten on the medium, causes any problem when the high speed recording is performed. When the high speed recording is performed, then the time, which is required for the laser beam to pass over the mark position in the amorphous state subjected to the recording of information, is shortened, and the time, in which the crystallization temperature is retained, is shortened as well. If the time, in which the crystallization temperature is retained, is too short, it is impossible to effect any sufficient crystal growth. Therefore, in the case of the conventional technique as described above, the overwrite characteristic is deteriorated when the high speed recording is performed. As a result of further investigations performed by the inventors, it has been revealed that the overwrite characteristic is conspicuously deteriorated when the medium, on which the high speed recording has been performed, is taken out into an ordinary temperature environment to perform the overwrite recording after retaining the medium in a high temperature environment for a certain period of time. In the present invention, the characteristic, which is obtained when information is overwritten after retaining the medium in a high temperature environment for a certain period of time, is referred to as "archival overwrite characteristic" which is especially distinguished from the ordinary overwrite characteristic.

In the technique of Patent Document 1 described above, the deterioration of the overwrite characteristic, which is caused by any uneven crystallization when the initialization process is performed at a high speed, is improved. The recording speed or velocity, which is obtained in Example, is 7.5 m/sec which is not more than 8.2 in/sec as adopted in the ×2 speed recording on the presently used DVD-RAM. In particular, the technique does not provide any countermeasure in which the problem involved in the high speed recording exceeding 8.0 m/sec, and especially the problem involved in the archival overwrite characteristic are taken into consideration. Further, this patent document merely describes that the range of the erasing power is higher than the optimum erasing power and lower than the maximum power at which the recording layer is not melted. In the case of this method, it has been revealed that the following problem arises. That is, when the high speed recording is performed, then the mark is erased due to the recording on the adjoining track, or the leakage of the reproduced signal from the adjoining track tends to occur.

Therefore, an object of the present invention is to solve the problems involved in the conventional technique as described above and provide an information-recording method, an information-recording medium, and an information-recording apparatus which make it possible to improve overwrite characteristics in the high speed recording, especially archival overwrite characteristics for overwriting information after retaining the medium in a high temperature environment for a certain period of time.

According to a first aspect of the present invention, there is provided an information-recording method for recording information on an information-recording medium by radiating a light beam power-modulated to be at a recording power level and an erasing power level, the information-recording method comprising:

overwriting a random pattern on the information-recording medium with light beams having a predetermined recording power and a variety of erasing powers;

reproducing the overwritten random pattern to determine a minimum value Pb1 and a maximum value Pb2 of the erasing power obtained when the pattern, in which a reproduction jitter or a reproduction error exceeds a predetermined threshold value, is erased;

determining an optimum erasing power Pb for performing the recording from the determined minimum value Pb1, the determined maximum value Pb2, and a relational expression represented by Pb=α×Pb1+(1−α)×Pb2; and recording the information with the determined optimum erasing power Pb.

The information-recording medium of the present invention may further comprise determining an optimum recording power Pp by using the determined optimum erasing power Pb. A value of α may be previously recorded on the information-recording medium, and the value of α may be read from the information-recording medium when the information is recorded. Pr<Pb1<Pb and Pb<Pb2<Pp may be satisfied provided that a reproducing power is Pr.

According to a second aspect of the present invention, there is provided an information-recording medium for recording and reproducing information thereon, the information-recording medium comprising:

an information-recording portion on which the information is recorded by being irradiated with a light beam having a recording power Pp and an erasing power Pb lower than the recording power Pp and on which the information is reproduced by being irradiated with a light beam having a reproducing power Pr lower than the erasing power Pb; and a control data portion, wherein:

information for determining an optimum erasing power Pb from a minimum erasing power Pb1 which satisfies Pr<Pb1<Pb and a maximum erasing power Pb2 which satisfies Pb<Pb2<Pp is previously recorded on the control data portion.

According to a third aspect of the present invention, there is provided an information-recording apparatus for recording information on an information-recording medium by radiating a light beam power-modulated to be at a recording power level and an erasing power level, the information-recording apparatus comprising:

an optical head which radiates the light beam onto the information-recording medium;

a driver which drives the optical head so that the light beam, which is power-modulated to be at the recording power level and the erasing power level, is outputted from the optical head; and a Pb-calculating control unit which reproduces a random pattern overwritten with light beams having a predetermined recording power and a variety of erasing powers to determine a minimum value Pb1 and a maximum value Pb2 of the erasing power obtained when the pattern with a reproduction jitter or a reproduction error exceeding a predetermined threshold value is erased, which reads a coefficient α which is used in an expression Pb=α×Pb1+(1−α)×Pb2 and has been previously recorded on the information-recording medium, and which determines an optimum erasing power Pb to be used when the recording is performed, from the determined minimum value Pb1, the determined maximum value Pb2, and the read coefficient α.

Figure 1:
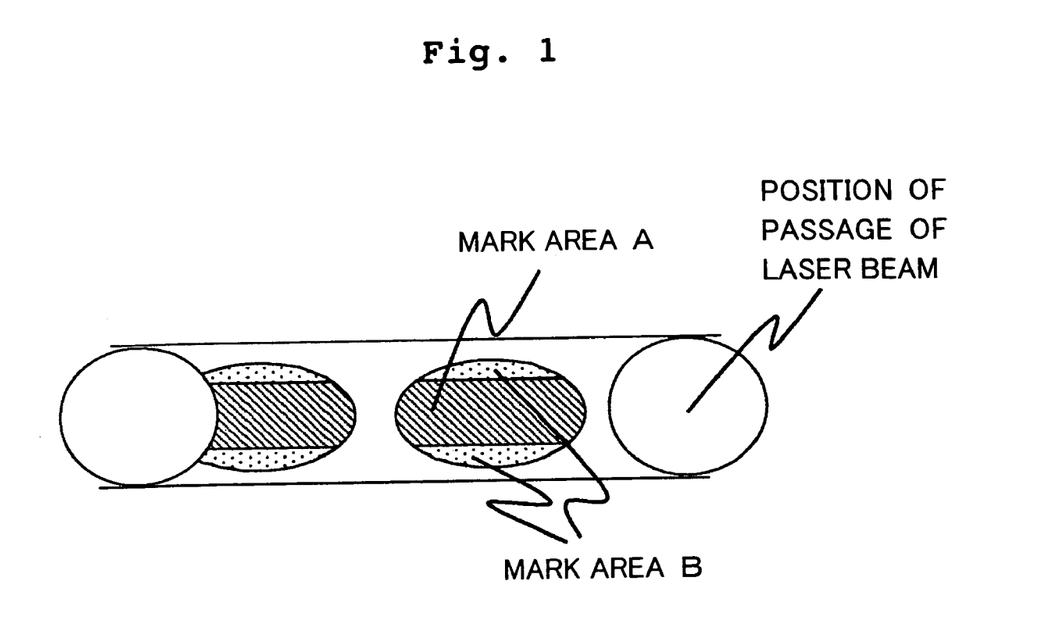
FIG. 1 schematically shows positions of passage of a laser beam and shapes of marks to be recorded on a medium.

The inventors have made the following consideration about the deterioration of the archival overwrite characteristic in the high speed recording in order to improve the problems involved in the conventional technique in the high speed recording. As shown in FIG. 1, the following fact is appreciated from the positional relationship between positions of passage of a laser beam and shapes of marks to be recorded on an information-recording medium. That is, it is considered that when the recording is performed at a high velocity, the temperature hysteresis, which is caused by the passage of the laser beam, differs between a mark area A disposed in the vicinity of the center of the position of the passage of the laser beam and a mark area B disposed at a place separated from the center of the laser beam.

Figure 2:
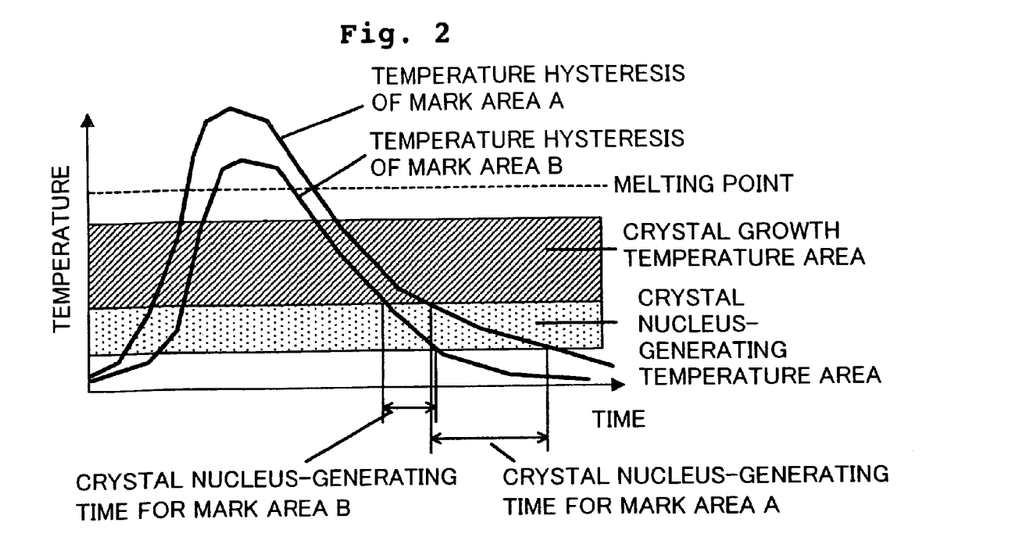
FIG. 2 schematically shows temperature hystereses with respect to the time in an area A and an area B obtained when a recording power is radiated.

At first, the step of recording data will be considered. FIG. 2 schematically shows temperature hystereses with respect to the time in the area A and the area B, obtained when the recording power is radiated. In relation to the temperature hysteresis in the mark area A disposed in the vicinity of the center of the passage of the laser beam, the temperature is gently lowered from the crystal growth temperature to the crystal nucleus-generating temperature and to room temperature after exceeding the melting point. On the other hand, in relation to the temperature hysteresis in the area B disposed separately from the neighborhood of the center of the passage of the laser beam, it is considered that the crystal nuclei-generating time is especially shortened as compared with the temperature hysteresis in the area A. When the overwrite recording is performed, then the mark is once erased by converting the amorphous state into the crystalline state, and then the mark is recorded in the amorphous state. In the area B, the number of crystal nuclei is small in the amorphous state as compared with the area A. Therefore, it is considered that the erasing, in which the state is returned to the crystalline state, is not facilitated, and the overwrite characteristic for the entire mark is consequently deteriorated. In other words, it is considered that as the speed is more increased, the difference in temperature hysteresis is more increased between the area A and the area B, and the crystal nucleus generation is more decreased in the area B, especially resulting in the deterioration of the archival overwrite characteristic in which information is rewritten after retaining the medium in the high temperature environment for a certain period of time.

Figure 3:
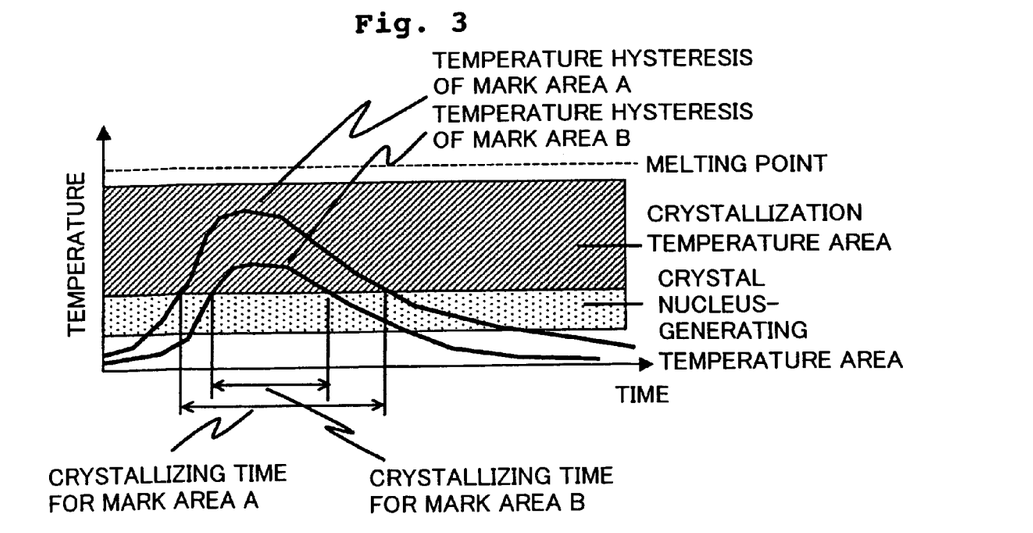
FIG. 3 schematically shows temperature hystereses with respect to the time in the area A and the area B obtained when an erasing power is radiated.

Next, the step of erasing data will be considered. FIG. 3 schematically shows temperature hystereses with respect to the time in the area A and the area B, obtained when the erasing power is radiated. In relation to the temperature hysteresis in the mark area A disposed in the vicinity of the center of the passage of the laser beam, the temperature is gently lowered to room temperature after being retained at the crystallization temperature for a certain period of time. On the other hand, in relation to the temperature hysteresis in the area B disposed separately from the neighborhood of the center of the passage of the laser beam, it is considered that the period of time, in which the temperature is retained at the crystallization temperature, is short as compared with the temperature hysteresis in the area A. As a result, the erasing of date, in which the state is returned from the amorphous state to the crystalline state, is not performed sufficiently in the area B as compared with the area A. In particular, it is considered that the archival overwrite characteristic is deteriorated for the entire mark when information is overwritten after retaining the medium in the high temperature environment for a certain period of time. That is, it is considered that the phenomenon, in which the archival overwrite characteristic is deteriorated as the recording is performed at the higher speed, is caused by the decrease in the crystal nucleus generation in the data-recording step and the insufficient crystallization in the erasing step.

The inventors have completed the information-recording method according to the first aspect of the present invention, the information-recording medium according to the second aspect, and the information-recording apparatus according to the third aspect on the basis of the knowledge as described above. When the information-recording method, the information-recording medium, and the information-recording apparatus of the present invention are used, the erasing laser power level Pb, at which the best archival overwrite performance is obtained for each of information-recording media, can be set when the trial writing is performed in order to establish the laser power before recording the information.

For example, in the case of the information-recording apparatus such as an optical disk drive, the trial writing is usually performed in order to determine optimum Pp and Pb before writing information on the optical disk. In this process, information is recorded with the optical disk drive while changing the laser power (overwrite) to measure the number of errors for the information written during the recording. For example, when the optimum erasing power level Pb is determined, then the minimum erasing power level Pb1 at which the number of errors is not less than a certain reference and the maximum erasing power level Pb2 are measured to obtain the intermediate power level Pb therebetween. The inventors have revealed the fact that the erasing power level, which is determined as described above, is not necessarily the optimum power level for the archival overwrite performance. When the relationship among Pb1, Pb2, and the optimum erasing power level Pb, especially the coefficient $\alpha$ in Pb=$\alpha \times$Pb1+(1-$\alpha$)$\times$Pb2 is previously recorded on the information-recording medium, it is possible to provide the information-recording medium in which the recording performance is less deteriorated even after the storage for a long term. Further, the recording method is provided, in which the value of the coefficient $\alpha$ in Pb=$\alpha \times$Pb1+(1-$\alpha$)$\times$Pb2 is read from the information-recording medium as described above to determine the optimum erasing power level Pb, and the recording is successfully performed by using the erasing power level Pb preferred for each of the recording speeds. The physical meaning of Pb1 is the laser power level at which the change is started from the crystalline state to the amorphous state, and Pb2 is the laser power level at which the change is started from the amorphous state to the crystalline state. Pb1 and Pb2 may be defined, for example, by the power level in which the jitter level of the reproduced signal is used as the threshold value. Alternatively, as described above, Pb1 and Pb2 may be defined by using the number of errors of information as the threshold value. In any case, the information, which is reproduced from the information-recording medium on which the value of $\alpha$ is recorded, can be used to set the erasing laser power level Pb at which the archival overwrite characteristic is optimized, by using the values of Pb1 and Pb2. Thus, it is possible to improve the archival overwrite characteristic.

As for the information-recording medium of the present invention, when the information-recording medium, on which the information in relation to the relationship among Pb, Pb1, and Pb2 is recorded together with information in relation to a recording velocity, is used, it is possible to set the erasing power at which the archival overwrite characteristic is optimized depending on each of the recording velocities when the recording velocity is changed for each of recording radiuses as in the information-recording apparatus based on the CAV (Constant Angular Velocity) system. Thus, it is possible to improve the archival overwrite characteristic.

As for the information-recording medium of the present invention, the information, which relates to the relationship among Pb, Pb1, and Pb2, may be defined by Pb=$\alpha \times$Pb1+(1-$\alpha$)$\times$Pb2 by using the ratio a between Pb1 and Pb2. When this information-recording medium is used, it is possible to set the optimum erasing power at which the archival overwrite characteristic is optimized for each of the recording velocities on the basis of the margin curve of the erasing power to be used when the erasing power is optimized with the drive for the $\times 2$ speed recording (recording velocity: 8.2 m/sec, transfer rate: 22 Mbps) for DVD-RAM commercially available at present. The dispersion of the archival overwrite characteristic, which would be otherwise caused depending on the recording velocity, disappears. In particular, it is unnecessary to perform any complicated design change of the drive as well. Thus, it is possible to guarantee the downward compatibility for the drive when the recording velocity is quickened.

As for the information-recording medium of the present invention, on condition that the value of $\alpha$ satisfies $\alpha \leq 0.50$, when the value of the erasing power Pb is set to be a value of not less than $0.50 \times$Pb1+$0.50 \times$Pb2, then the laser energy is enhanced upon the erasing during the high speed overwrite, and the period of time, in which the temperature is retained at a temperature of not less than the crystallization temperature, is relatively prolonged. Further, when the erasing of data is sufficiently performed to make the return from the amorphous state to the crystalline state, it is possible to improve the archival overwrite characteristic during the high speed recording. In particular, on condition that the value of $\alpha$ satisfies $0.25 \leq \alpha \leq 0.50$, when the value of Pb is set to be not less than $0.50 \times$Pb1+$0.50 \times$Pb2 and not more than $0.25 \times$Pb1+$0.75 \times$Pb2, it is possible to suppress the erasing of the mark signal on the adjoining track, which would be otherwise caused by the increase in the size of the recording mark. Further, when the recording is performed with any different information-recording apparatus, the cross power overwrite characteristic, which is the overwrite characteristic assuming that the recording power differs, can be also retained to have a satisfactory value. The cross power overwrite characteristic herein refers to the characteristic to be obtained when the overwrite recording is performed at a recording power of 90% after performing the recording at a power of 105% on condition that the optimum recording power is 100%.

When the information-recording medium of the present invention is used, it is possible to perform the high speed recording, in which the recording linear velocity is not less than 9 m/sec. Further, the generation of crystal nuclei during the recording of data and the retention of the crystallizing time during the erasing of data are facilitated. Thus, it is possible to improve the archival overwrite characteristic during the high velocity recording.

When the information-recording apparatus, in which information is recorded by using the information-recording medium of the present invention, is used, the following advantage is obtained when the recording is performed by using a plurality of information-recording apparatuses having different recording velocities by using the identical information-recording medium. That is, the information on the recording velocity and the erasing power, which is previously written on the information-recording medium, is read by the information-recording apparatus to record information, and thus the recording compatibility can be obtained for the information-recording apparatuses.

When the information-recording method and the information-recording medium of the present invention are used, then the recording can be performed with the erasing power which is optimized depending on the recording speed, and the archival overwrite characteristic is optimized. The information-recording apparatus of the present invention makes it possible to read the information in relation to the optimized erasing power from the information-recording medium and execute the recording with the optimized erasing power.

DESCRIPTION OF THE PREFERRED EMBODIMENTS

Embodiments of the present invention will be explained below on the basis of results of experiments performed by the inventors.

An information-recording medium was obtained as follows. That is, films were successively formed with the sputtering process on a polycarbonate substrate having a radius of 120 mm and a thickness of 0.6 mm with a surface covered with concave/convex guide grooves having a track pitch of 1.2 μm and a groove depth of 63 nm on the basis of the format for 4.7 GB DVD-RAM such that ZnS—$SiO_2$ was formed as a first protective layer to have a thickness of 100 nm, GeCrN was formed as a first interface layer to have a thickness of 10 nm, BiGeTe was formed as a recording layer to have a thickness of 10 nm, GeCrN was formed as a second interface layer to have a thickness of 10 nm, ZnS—$SiO_2$ was formed as a second protective layer to have a thickness of 50 nm, GeCr was formed as a heat absorption factor-correcting layer to have a thickness of 50 nm, and Al was formed as a heat-diffusing layer to have a thickness of 120 nm. Thus, the information-recording medium used in the embodiment was obtained.

Figure 4:
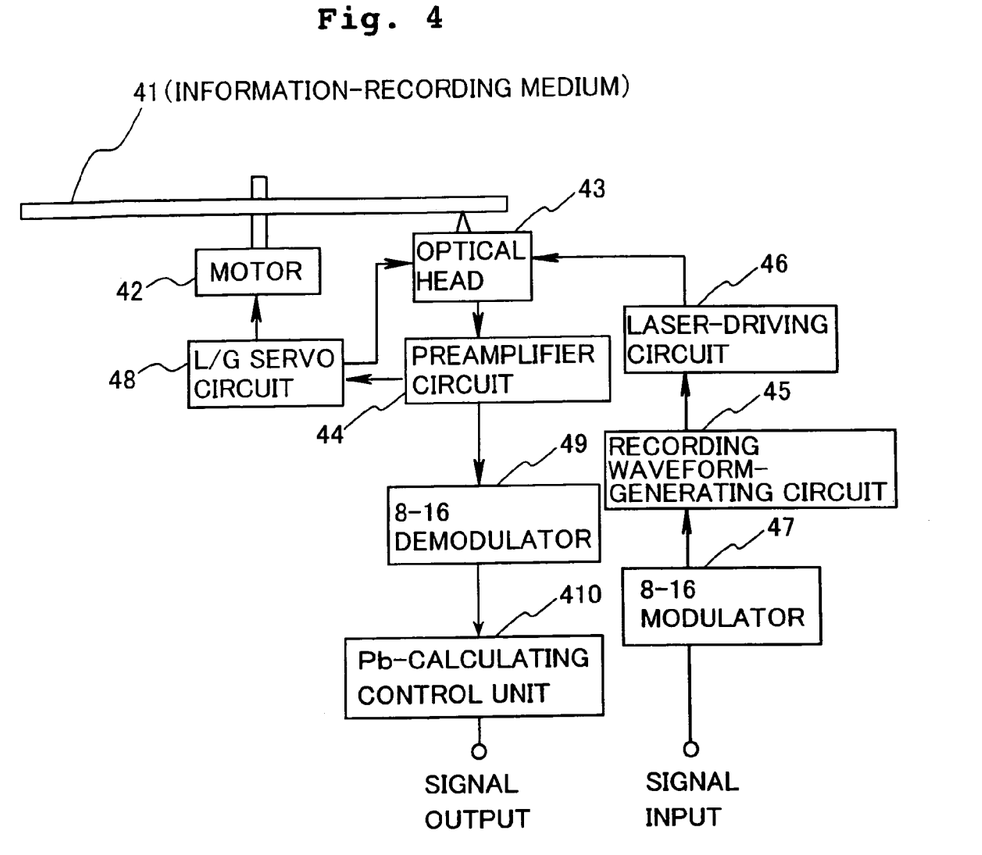
FIG. 4 schematically shows a recording and reproducing apparatus equipped with an information-recording medium used to investigate recording and reproduction characteristics in the embodiments of the present invention.

When the recording and reproduction characteristics were investigated after crystallizing the information-recording medium by using a laser initializing apparatus, an information-recording and reproducing apparatus equipped with an optical recording medium shown in FIG. 4 was used.

An explanation will be made below about the recording and reproduction process and the operation of the information-recording and reproducing apparatus equipped with the optical recording medium used in the embodiment of the present invention. At first, the information, which is supplied from the outside of the recording apparatus, is transmitted to an 8-16 modulator 47 while one unit comprises 8 bits. When the information is recorded on the information-recording medium 41, the modulation system in which 8-bit information is converted into 16-bit information, i.e., the so-called 8-16 modulation system is used. In this modulation system, the information composed of mark lengths of 3 T to 14 T, which corresponds to the 8-bit information, is recorded on the information-recording medium. The 8-16 modulator 47 shown in FIG. 4 performs this modulation. "T" herein means the data clock length upon the information recording. In this embodiment, T was 17.1 ns when the recording linear velocity was 8.2 m/sec, T was 8.6 ns when the recording linear velocity was 16.4 m/sec, and T was 5.7 ns when the recording linear velocity was 24.6 m/sec.

Figure 5:
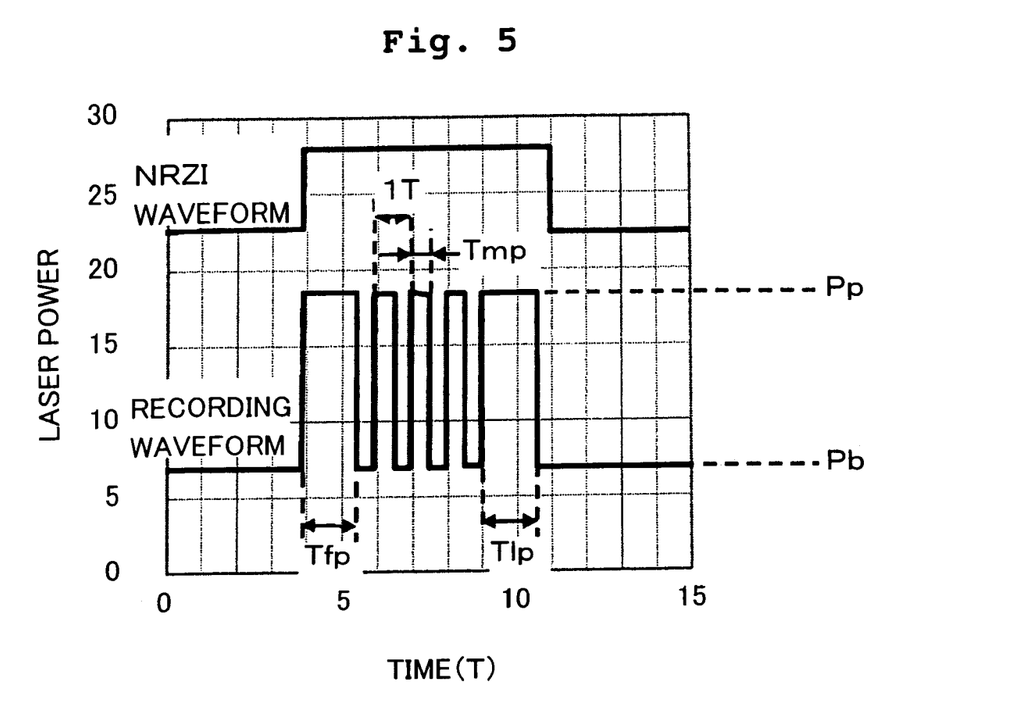
FIG. 5 explains the strategy for the recording pulse used to investigate recording and reproduction characteristics in the embodiments of the present invention.

The digital signals of 3 T to 14 T converted by the 8-16 modulator 47 are transmitted to a recording waveform-generating circuit 45. Assuming that the width of the pulse of the power at the first power level Pp as the recording power is about T/2, the laser is radiated at the first power level Pp and the second power level Pb as the erasing power with the width of about T/2 in the radiation time for the laser of Pp to generate a multi-pulse recording waveform in which the laser is radiated at the power level Pb between the series of pulses at the Pp level. In the recording waveform-generating circuit 45, the signals of 3 T to 14 T alternately correspond to "0" and "1" in time series. In the case of "0", the laser power at the power level of Pb is radiated, and in the case of "1", the laser power at the power level of Pp is radiated. In this procedure, the portion on the information-recording medium 41, which is irradiated with the laser beam at the power level of Pb, is changed into the crystal, and the portion, which is irradiated with the series of pulse sequence including pulses at the power level of Pb, is changed into the amorphous (mark portion). The recording waveform-generating circuit 45 has a multi-pulse waveform table corresponding to the system (adaptive recording waveform control) in which the leading pulse width Tfp and the trailing pulse width Tlp of the multi-pulse waveform as shown in FIG. 5 are changed depending on the space lengths before and after the mark portion when the series of pulse sequence including the pulse at the power level of Pb for forming the mark portion is formed. Thus, the recording waveform-generating circuit 45 generates the multi-pulse recording waveform which makes it possible to maximally exclude the influence of the thermal interference between the marks generated between the marks.

The recording waveform, which is generated by the waveform-generating circuit 45, is transmitted to the laser-driving circuit (driver) 46. The laser-driving circuit 46 controls a semiconductor laser included in an optical head 43 to emit light on the basis of the recording waveform. The semiconductor laser having a wavelength of 655 nm is used as the laser beam for recording information in the optical head 43 which is carried on the information-recording and reproducing apparatus equipped with the optical recording medium of the present invention. The laser beam is focused onto the recording layer of the information-recording medium 41 with an objective lens having NA of 0.6. The laser beam of the laser corresponding to the recording waveform is radiated to perform the recording.

The information-recording and reproducing apparatus equipped with the optical recording medium of the present invention is adapted to the recording system (so-called the land-groove system) in which information is recorded on both of the groove and the land (area between the grooves). In the information-recording and reproducing apparatus equipped with the optical recording medium of the present invention, an L/G serve circuit 48 can be used to arbitrarily select the tracking for the land and the groove. The recorded information was reproduced by using the optical head 43 as well. A reproduced signal is obtained by radiating the laser beam onto the recorded marks and detecting the reflected light beam from the marks and the portions other than the marks. The amplitude of the reproduced signal is increased by using a preamplifier circuit 44, followed by being transferred to an 8-16 demodulator 49. The 8-16 demodulator makes the conversion into 8-bit information for every 16 bits. As a result of the operation as described above, the reproduction from the recorded marks is completed. When the recording is performed on the optical information-recording medium 41 under the condition as described above, then the mark length of the 3 T mark as the shortest mark is about 0.42 µm, and the mark length of the 14 T mark as the longest mark is about 1.96 µm.

When the jitter was evaluated, a random pattern signal including 3 T to 14 T was subjected to the recording and reproduction. An obtained reproduced signal was subjected to the processes of the waveform equivalence, the conversion into the binary system, and PLL (Phase Locked Loop) to measure the jitter. When the signal was reproduced, the linear velocity was constant at 8.2 m/sec irrelevant to the recording velocity.

The archival overwrite jitter, the cross power overwrite jitter, and the cross erase jitter were measured as described below in relation to the characteristic evaluation.

At first, as for the archival overwrite jitter, the random pattern was recorded ten times on the track. After that, an acceleration test was performed with the storage in an environment of 90° C. and 30% R.H. for 20 hours, and then the temperature was returned to room temperature to overwrite the random pattern. The reproducing laser power Pr was set to 1.0 mW to measure the jitter. As a result of investigations performed by the inventors, the increase in the archival overwrite jitter is approximately saturated by the storage in the environment of 90° C. and 30% R.H. for 20 hours. Therefore, it is considered that the overwrite characteristic corresponding to 10 years at room temperature can be guaranteed if the characteristic can be guaranteed in the environment described above. In the embodiment of the present invention, the target value of the jitter is set to be not more than 10% and the normalized upper limit value is set to be not more than 11% for the archival overwrite jitter when the recording is performed at linear velocities of 8.2 to 24.6 m/sec as the ×2 to ×6 speed recording operations with clock lengths of 17.1 to 5.7 ns and data transfer rates of 22 to 66 Mbps. The normalized upper limit value herein refers to the upper limit value of the characteristic at which the medium can be actually used in the drive without any problem.

As for the cross power overwrite jitter, the random pattern was recorded ten times on the track with the optimum laser power. After that, the overwrite was made once with a power which was 105% of the optimum laser power, and the overwrite was made once thereon with a power which was 90% of the optimum laser power. The reproducing laser power Pr was set to 1.0 mW to measure the jitter. The cross power overwrite jitter is the characteristic to guarantee the reliability of data when the overwrite recording is performed in different drives at different recording powers, i.e., the characteristic to represent the recording compatibility of the drive. In the embodiment of the present invention, the target value of the jitter is set to be not more than 11%, and the normalized upper limit value is set to be not more than 12% for the cross power overwrite jitter.

As for the cross erase jitter, the random pattern was recorded ten times on the middle track, and then the random pattern was recorded ten times from the inner circumference to the outer circumference on the tracks disposed on both sides thereof and further on the track disposed on both sides thereof in this order. After that, the reproducing laser power Pr was set to 1.0 mW to measure the jitter value on the central track of the five tracks. The cross erase jitter is the characteristic to represent the erasing of the mark due to the recording on the adjoining track and the leakage of the reproduced signal from the adjoining track. In the embodiment of the present invention, the target value of the jitter was set to be not more than 8%, and the normalized upper limit value is set to be not more than 9% for the cross erase jitter.

An explanation will be made below about the procedure to investigate the value of the jitter by recording and reproducing data while changing the construction of the recording pulse sequence (recording strategy) and the linear velocity by using the apparatus for evaluating the optical recording medium as described above. In this embodiment, the linear velocity of the recording is set to 8.2 m/sec, the clock length of the recording data is set to 17.1 ns, and the data transfer rate is set to 22 Mbps for the ×2 speed recording. For the ×4 speed recording, the linear velocity of the recording is set to 16.4 m/sec, the clock length of the recording data is set to 8.6 ns, and the data transfer rate is set to 44 Mbps. For the ×6 speed recording, the linear velocity of the recording is set to 24.6 m/sec, the clock length of the recording data is set to 5.7 ns, and the, data transfer rate is set to 66 Mbps.

The recording strategy at each of the recording velocities, the recording power Pp, and the erasing power Pb were determined as follows.

At first, temporary laser powers were set to Pp0=10.5 mW and Pb0=4.0 mW in the ×2 speed recording, Pp0=13.0 mW and Pb0.=5.0 mW in the ×4 speed recording, and Pp0=14.0 mW and Pb0=5.5 mW in the ×6 speed recording. At each of the recording velocities, the temporary laser power was used to record the marks of 3 T to 14 T. The leading pulse width Tfp and the trailing pulse width Tlp before and after each of the 3 T to 14 T marks were determined as illustrated in the recording waveform shown in FIG. 5 so that the thermal interference between the marks generated between the marks was minimized, which was used as the recording strategy. In this process, the width Tmp of the multi-pulse was a half of the clock length at each of the recording velocities.

Figure 6:
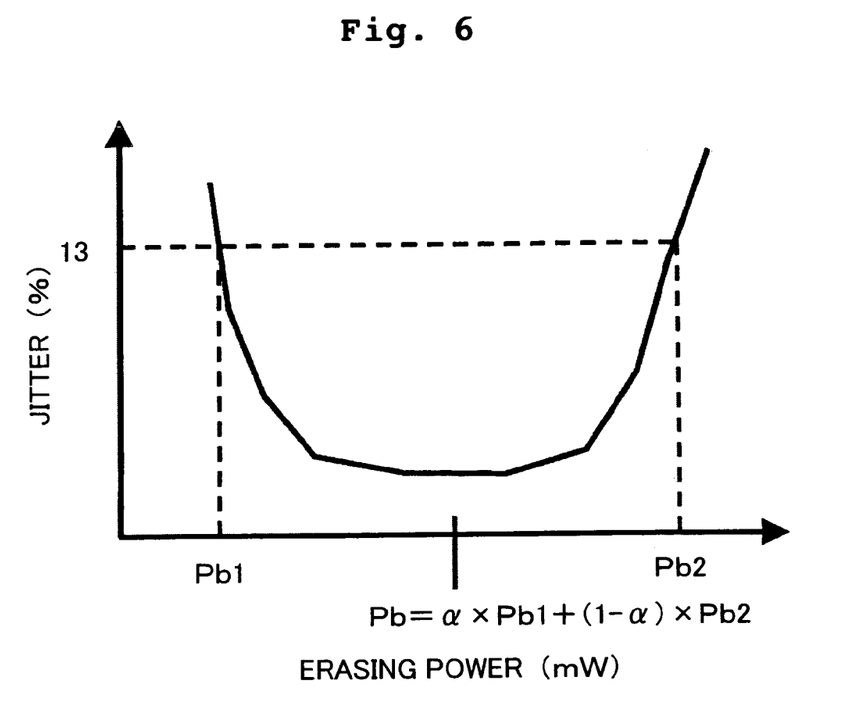
FIG. 6 schematically shows the dependency of the jitter on the erasing power to illustrate the definition of the erasing power used in the embodiments of the present invention.

Subsequently, the recording power was set to the temporary recording power Pp0 by using the recording strategy as described above at each of the recording velocities, and the erasing power Pb was set to values at 0.2 mW intervals from 2.0 mW to 8.0 mW. The random pattern was recorded ten times. After that, the reproducing laser power Pr was set to 1.0 mW to measure the jitter. Thus, the dependency of the jitter on the erasing power was investigated as shown in FIG. 6. The following method was used to determine the erasing power Pb to be used when the data was actually recorded. That is, the lower erasing power was designated as Pb1, and the higher erasing power was designated as Pb2, which were the erasing powers at which the jitter was 13% in the dependency of the jitter on the erasing power as shown in FIG. 6. In this investigation, Pb1=2.5 mW and Pb2=6.1.mW were given in the ×2 speed recording, Pb1=3.5 mW and Pb2=6.8 mW were given in the ×4 speed recording, and Pb1=4.3 mW and Pb2=7.4 mW were given in the ×6 speed recording. Further, the following fact was revealed. That is, the shape of the curve obtained in this case by plotting the jitter with respect to the recording power at each of the recording velocities was not only shifted due to the difference in power levels of Pb1 and Pb2, but the power range was also obtained, in which the jitter was low and stable with the low jitter power range which resided in the central value of Pb1–Pb2 at the ×2 speed, while the curve was shifted toward the high power side from the central value of Pb1–Pb2 when the recording velocity was high. According to this fact, it is affirmed that the minimum jitter is not necessarily obtained depending on the recording speed or velocity by merely setting Pb to (Pb1-Pb2)/2.

The following method was used to determine the erasing power Pb to be used when the data was recorded at each of the recording velocities. That is, the ratio between Pb1 and Pb2 was used to make the setting as Pb=α×Pb1+(1−α)×Pb2, and the value of Pb was determined at the erasing power as described above while changing the value of α to satisfy α=0.2 to 0.6.

Figure 7:
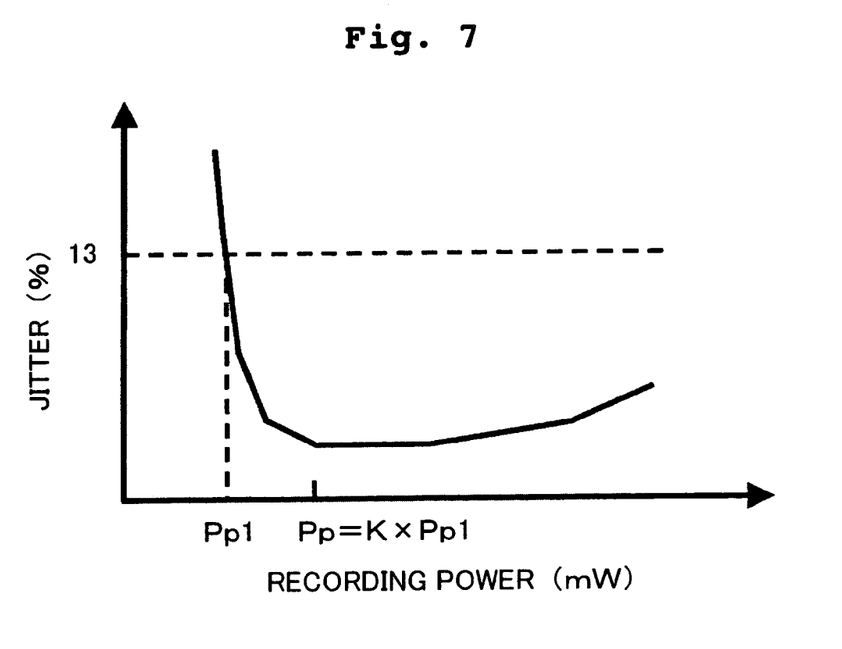
FIG. 7 schematically shows the dependency of the jitter on the recording power to illustrate the definition of the recording power used in the embodiments of the present invention.

The recording power was set at intervals of 0.5 mW from 8.0 mW to 16.0 mW by using the recording strategy as described above for each of the determined values of Pb. The random pattern was recorded ten times. After that, the reproducing laser power Pr was set to 1.0 mW to measure the jitter, and the dependency of the jitter on the recording power was investigated as shown in FIG. 7. In the dependency of the jitter on the recording power shown in FIG. 7, the optimum recording power Pp was determined with Pp=K×Pb1 as the function of Pp1 with respect to the recording power Pp1 at which the jitter was 13%. In this process, the optimum recording power resided in K=1.25 in the ×2 speed recording, K=1.30 in the ×4 speed recording, and K=1.30 in the ×6 speed recording.

The recording strategy, the recording power Pp, and the erasing power Pb determined as described above were used to measure the archival overwrite jitter, the cross power overwrite jitter, and the cross erase jitter as the qualities of the recording signal in relation to the respective recording velocities on the land. The relationship between the quality of the recording signal and the value of α when the erasing power Pb was determined was investigated.

EXAMPLE 1

The value of α was changed to 0.60, 0.50, 0.40, 0.35, 0.30, 0.25, and 0.20 at a linear velocity of 8.2 m/sec as the ×2 speed recording to determine recording powers at the respective erasing powers. After that, the archival overwrite jitter, the cross power overwrite jitter, and the cross erase jitter were investigated at the respective values of α. Obtained results are shown in Table 1.

TABLE 1

|  | α | | | | | | |
| --- | --- | --- | --- | --- | --- | --- | --- |
|  | 0.60 | 0.50 | 0.40 | 0.35 | 0.30 | 0.25 | 0.20 |
| Recording power Pp (mW) | 11.0 | 10.7 | 10.6 | 10.5 | 10.4 | 10.3 | 10.2 |
| Erasing power Pb (mW) | 3.9 | 4.3 | 4.7 | 4.8 | 5.0 | 5.2 | 5.4 |
| Archival overwrite jitter (%) | 8.5 | 8.3 | 8.3 | 8.4 | 8.4 | 8.5 | 8.8 |
| Cross power overwrite jitter (%) | 11.0 | 10.8 | 10.8 | 10.9 | 11.6 | 12.4 | 13.1 |
| Cross erase jitter (%) | 8.2 | 8.0 | 8.3 | 9.1 | 9.6 | 10.1 | 10.7 |

When the ×2 speed recording is performed at the linear velocity of 8.2 m/sec, then the archival overwrite jitter is approximately constant within a range of α=0.60 to 0.25, and the jitter is slightly deteriorated when the value of α is smaller than the value described above. On the other hand, such a tendency is observed that the cross power overwrite jitter is approximately constant within a range of α=0.60 to 0.35, and the jitter is deteriorated when the value of α is smaller than the above. Further, the cross erase jitter is approximately constant within a range of α=0.60 to 0.40, and the jitter is deteriorated when the value of α is smaller than the above.

When the target value of the archival overwrite jitter is 10%, the target value of the cross power overwrite jitter is 11%, and the target value of the cross erase jitter is 8%, then the target values are achieved at α=0.50 in the case of the ×2 speed recording at the linear velocity of 8.2 m/sec. When the normalized upper limit value of the archival overwrite jitter is 11%, the normalized upper limit value of the cross power overwrite jitter is 12%, and the normalized upper limit value of the cross erase jitter is 9% as the allowable limits of the characteristics, then the normalized values are satisfied within a range of α=0.60 to 0.40 in the case of the ×2 speed recording at the linear velocity of 8.2 m/sec. However, taking the margins of the respective characteristics into consideration, the following fact is affirmed. That is, it is most preferable to set to α=0.50 in the case of the ×2 speed recording at the linear velocity of 8.2 m/sec.

EXAMPLE 2

The value of α was changed to 0.60, 0.50, 0.40, 0.35, 0.30, 0.25, and 0.20 at a linear velocity of 16.4 m/sec as the ×4 speed recording to determine recording powers at the respective erasing powers. After that, the archival overwrite jitter, the cross power overwrite jitter, and the cross erase jitter were investigated at the respective values of α. Obtained results are shown in Table 2.

TABLE 2

|  | α | | | | | | |
| --- | --- | --- | --- | --- | --- | --- | --- |
|  | 0.60 | 0.50 | 0.40 | 0.35 | 0.30 | 0.25 | 0.20 |
| Recording power Pp (mW) | 11.6 | 11.4 | 11.2 | 11.1 | 11.0 | 10.9 | 10.8 |
| Erasing power Pb (mW) | 4.8 | 5.2 | 5.5 | 5.6 | 5.8 | 6.0 | 6.1 |
| Archival overwrite jitter (%) | 11.5 | 10.3 | 9.6 | 9.4 | 9.5 | 9.6 | 9.8 |
| Cross power overwrite jitter (%) | 12.1 | 11.5 | 11.0 | 10.9 | 11.1 | 11.7 | 12.5 |
| Cross erase jitter (%) | 7.6 | 7.6 | 7.6 | 7.8 | 7.8 | 7.8 | 8.3 |

When the ×4 speed recording is performed at the linear velocity of 16.4 m/sec, then the archival overwrite jitter is approximately constant within a range of α=0.40 to 0.20, and the jitter is deteriorated when the value of α is larger than the above. On the other hand, such a tendency is observed that the cross power overwrite jitter is approximately constant within a range of α=0.40 to 0.30, and the jitter is deteriorated when the value of α is smaller or larger than the above. Such a tendency is observed that the cross erase jitter is approximately constant within a range of α=0.60 to 0.25, and the jitter is deteriorated when the value of α is smaller than the above.

In the case of the ×4 speed recording at the linear velocity of 16.4 m/sec, the target values are satisfied within a range of α=0.40 to 0.35. Further, the normalized upper limit values are satisfied within a range of α=0.50 to 0.25. Considering the fact that the archival overwrite jitter and the cross erase jitter are minimized within the range as described above, the following fact is affirmed. That is, in the case of the ×4 speed recording at the linear velocity of 16.4 m/sec, it is most preferable to set to α=0.35.

As compared with the recording at the linear velocity of 8.2 m/sec in Example 1, in the case of the higher speed recording at the linear velocity of 16.4 m/sec, the archival overwrite jitter is clearly improved when the value of α is smaller than 0.5. In particular, as for the archival overwrite jitter, the optimum value of α is not only shifted to the smaller range, but the range of α itself is also narrowed to about a half of that obtained in the ×2 speed recording. It is more important to set the optimum recording strategy.

EXAMPLE 3

The value of α was changed to 0.60, 0.50, 0.40, 0.35, 0.30, 0.25, and 0.20 at a linear velocity of 24.6 m/sec as the ×6 speed recording to determine recording powers at the respective erasing powers. After that, the archival overwrite jitter, the cross power overwrite jitter, and the cross erase jitter were investigated at the respective values of α. Obtained results are shown in Table 3.

TABLE 3

|  | α | | | | | | |
| --- | --- | --- | --- | --- | --- | --- | --- |
|  | 0.60 | 0.50 | 0.40 | 0.35 | 0.30 | 0.25 | 0.20 |
| Recording power Pp (mW) | 14.4 | 14.3 | 14.1 | 14.0 | 13.9 | 13.8 | 13.7 |
| Erasing power Pb (mW) | 5.5 | 5.9 | 6.2 | 6.3 | 6.5 | 6.6 | 6.8 |
| Archival overwrite jitter (%) | 12.3 | 11.2 | 10.4 | 9.9 | 9.8 | 10.0 | 10.5 |

TABLE 3-continued

|  | α | | | | | | |
| --- | --- | --- | --- | --- | --- | --- | --- |
|  | 0.60 | 0.50 | 0.40 | 0.35 | 0.30 | 0.25 | 0.20 |
| Cross power overwrite jitter (%) | 12.5 | 12.1 | 11.5 | 11.0 | 10.8 | 11.0 | 11.1 |
| Cross erase jitter (%) | 8.0 | 7.9 | 7.9 | 7.8 | 7.9 | 8.1 | 8.6 |

When the ×6 speed recording is performed at the linear velocity of 24.6 m/sec, then the archival overwrite jitter is approximately constant within a range of α=0.35 to 0.25, and the jitter is deteriorated when the value of α is larger than the above. On the other hand, such a tendency is observed that the cross power overwrite jitter is approximately constant within a range of α=0.35 to 0.20, and the jitter is deteriorated when the value of α is larger than the value described above. Such a tendency is observed that the cross erase jitter is approximately constant within a range of α=0.60 to 0.25, and the jitter is deteriorated when the value of α is smaller than the above.

In the case of the ×6 speed recording at the linear velocity of 24.6 m/sec, the target values are satisfied within a range of α=0.35 to 0.25. Further, the normalized upper limit values are satisfied within a range of α=0.40 to 0.20. Considering the fact that the archival overwrite jitter and the cross erase jitter are minimized within the range as described above, the following fact is affirmed. That is, in the case of the ×6 speed recording at the linear velocity of 24.6 m/sec, it is most preferable to set to α=0.30. As compared with the recording at the linear velocity of 8.2 m/sec in Example 1 and the high speed recording at the linear velocity of 16.4 m/sec in Example 2, in the case of the higher speed recording at the linear velocity of 24.6 m/sec in Example 3, the archival overwrite jitter is clearly improved when the value of α is decreased. Further, the optimum value of α is not only shifted to the smaller, range as compared with the ×4 speed recording, but the range of α itself is also narrowed to about a half of that obtained in the ×4 speed recording. It is more important to set the optimum recording strategy.

The results of Examples 1, 2, and 3 described above are summarized as follows. The erasing power level Pb is defined to be Pb=α×Pb1+(1−α)×Pb2 by using the value Pb1 which is larger than the reproducing power Pr and smaller than Pb and the value Pb2 which is larger than Pb and smaller than the recording power Pp. On this definition, the value of α is given as follows, which is most preferred to improve the archival overwrite jitter, the cross power overwrite jitter, and the cross erase jitter. That is, α=0.50 is given when the recording is performed at the linear velocity of 8.2 m/sec, α=0.35 is given when the recording is performed at the linear velocity of 16.4 m/sec, and α=0.30 is given when the recording is performed at the linear velocity of 24.6 m/sec.

The optimum ranges of α in Examples 1, 2, and 3 are compared with each other as shown in Table 4. Both of the value and the range of α corresponding to the recording speed greatly differ in relation to the archival overwrite jitter and the cross power overwrite jitter with good results for all of the characteristics including the cross erase jitter. Further, no α exists, which is capable of covering all of the recording velocities. Therefore, it is necessary that α is set depending on the recording velocity, and it is necessary to set the recording power Pp and the erasing power Pb.

TABLE 4

| | | α | | | | |
|---|---|---|---|---|---|---|
| | | 0.6 | 0.5 | 0.4 | 0.3 | 0.2 |
| Archival overwrite jitter | x2 | optimum | | | | |
| | x4 | | optimum | | | |
| | x6 | | | optimum | | |
| Cross power overwrite jitter | x2 | optimum | | | | |
| | x4 | | optimum | | | |
| | x6 | | | optimum | | |
| Cross erase jitter | x2 | optimum | | | | |
| | x4 | optimum | | | | |
| | x6 | optimum | | | | |

*optimum: optimum value range.
*x2: x2 speed, x4: x4 speed, x6: x6 speed.

The reason, why the optimum α differs depending on the linear velocity of the recording as described above, is considered to be as follows. As the recording speed is increased, the crystal nucleus generation is decreased in the recording process, and the crystallization is insufficient in the erasing process. As a result, the archival overwrite characteristic is deteriorated. On the contrary, it is considered that the crystal nucleus generation in the recording process and the crystallization in the erasing process are facilitated by performing the recording at the optimum erasing power by changing the definition of the erasing power determined from the dependency of the erasing power on the jitter in accordance with the linear velocity of the recording.

However, when the erasing power is increased, the archival overwrite jitter, the cross power overwrite jitter, and the cross erase jitter are deteriorated. Therefore, the setting of the appropriate erasing power at each recording velocity, i.e., the appropriate value of α exists. In other words, when the information in relation to the relationship among Pb1, Pb2, and Pb is previously recorded on the medium, then the recording can be performed at the preferred erasing power, and it is possible to improve the archival overwrite jitter. Further, when the information in relation to α to represent the value of Pb with the ratio between the value of Pb1 and the value of Pb2 is previously recorded on the medium, then the recording can be performed at the appropriate erasing power at each linear velocity, and it is, possible to improve the archival overwrite jitter, the cross power overwrite jitter, and the cross erase jitter.

As explained above, it is possible to improve the overwrite characteristics when the high speed recording is performed, especially the archival overwrite characteristics for overwriting information after retaining the medium in a high temperature environment for a certain period of time by using the information-recording medium on which information is recorded by relatively scanning the information-recording medium across a laser beam at a linear velocity within a certain range, and power-modulating a laser power of the laser beam to obtain at least a recording laser power Pp and an erasing laser power level Pb lower than a recording laser power level to change a state of an information-recording portion of the information-recording medium, and the information is reproduced-with a laser beam at a reproducing laser power level Pr which is lower than the erasing laser power level Pb, wherein information in relation to a relationship among a value Pb1 which is larger than Pr and smaller than Pb, a value Pb2 which is larger than Pb and smaller than Pp, and Pb is recorded.

EXAMPLE 4

In this embodiment, the information-recording medium, on which the preferred value of α obtained in the foregoing embodiment had been previously recorded, was subjected to the reproduction with the information-recording and reproducing apparatus, and the data was read and written by using the value of α to investigate the archival overwrite characteristic.

Stampers were manufactured in order to produce disks each of which had the format of 4.7 GB DVD-RAM and each of which was written with information on α, the sensitivity coefficient of recording, and information on the recording strategy for each of the x5 speed recording and the x6 speed recording on the control data portion in the same manner as in the x2 speed recording. In this case, two types of the stampers were manufactured, i.e., Stamper A in which the values of α for the x5 speed recording and the x6 speed recording satisfied α=0.50 and α=0.50 respectively and Stamper B in which the values of α for the x5 speed recording and the x6 speed recording satisfied α=0.40 and α=0.35 respectively. In this case, α is the coefficient to determine the erasing power Pb from the relational expressions of Pb=α×Pb1+(1−α)×Pb2, Pb1<Pb2.

Figure 8:
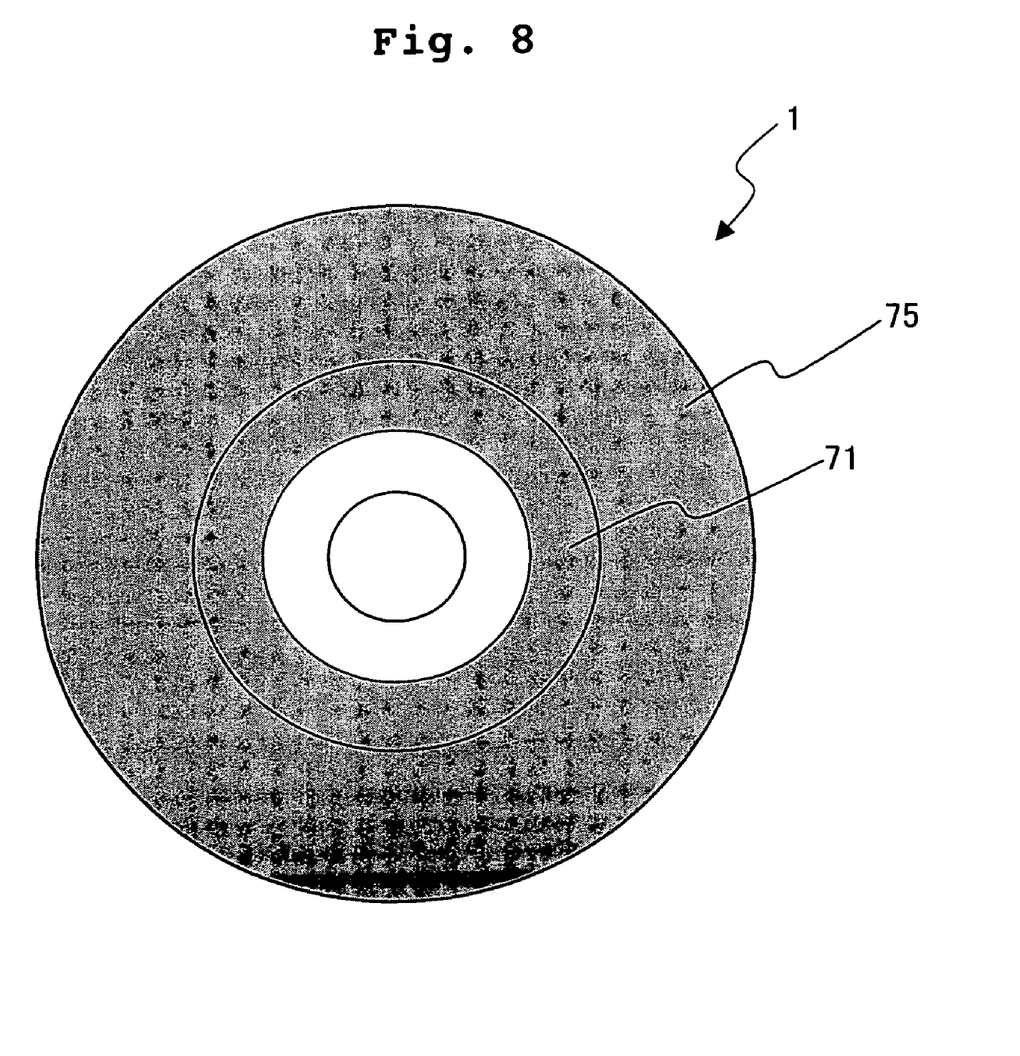
FIG. 8 schematically shows an information-recording portion and a control data portion on an information-recording medium according to the present invention.

Polycarbonate substrates A and B were formed by the injection molding by using Stamper A and Stamper B. Films were successively formed by the sputtering on each of the obtained substrates such that ZnS—SiO$_2$ was formed to have a thickness of 100 nm as a first protective layer, GeCrN was formed to have a thickness of 10 nm as a first interface layer, BiGeTe was formed to have a thickness of 10 nm as a recording layer, GeGrN was formed to have a thickness of 10 nm as a second interface layer, ZnS—SiO$_2$ was formed to have a thickness of 50 nm as a second protective layer, GeCr was formed to have a thickness of 50 nm as a heat absorption factor-correcting layer, and Al was formed to have a thickness of 120 nm as a heat-diffusing layer to obtain the information-recording medium. FIG. 8 schematically shows an information-recording portion 75 and a control data portion 71 of the obtained information-recording medium 1. The information-recording medium was initialized to prepare Disk A and Disk B. Manufactured Disk A and Disk B were used to perform the x5 speed recording and the x6 speed recording with the drive.

An explanation will now be made about the recording and reproducing apparatus (drive unit) used herein to perform the x5 speed recording and the x6 speed recording. (1) At first, the apparatus reads the information on the recording power for the trial writing and the recording strategy for each of the speeds written on the control data portion. (2) Subsequently, the erasing power is changed by using the recording power and the recording waveform of the recording strategy which has been read, to record the random pattern in order to determine the erasing powers Pb1, Pb2 (Pb1<Pb2) at which the error exceeds the threshold value. In this procedure, the threshold value of the error is distinguished with the power at which the number of errors after correcting errors is suddenly changed from several hundreds to several ones. (3) The values of Pb1, Pb2 are used to determine the value of the erasing power Pb optimum for actually performing the recording according to the expression of Pb=α×Pb1+(1−α)×Pb2. (4) The determined value of the optimum erasing power Pb is used to record the 6 T pattern while changing the recording power to determine the recording compensation power at which the value of asymmetry of the 6 T pattern written on the control data portion is obtained. (5) The recording compensation power and the optimum erasing power are used to optimize the recording strategy. In this procedure, the recording strategy is optimized so that the error rate is minimized by changing the leading pulse width Tfp and the trailing pulse width Tlp of the multipulse waveform depending on the space lengths before and after the mark portion. (6) The optimized waveform of the recording strategy and the erasing power Pb are used to record the random pattern while changing the recording power to determine the recording power at which the error exceeds the threshold value. (7) Subsequently, the information on the sensitivity coefficient of the recording power written on the control data portion is read, and the determined recording power is multiplied by the sensitivity coefficient to obtain the optimum recording power. (8) The steps of (1) to (7) described above are performed for the ×5 speed recording and the ×6 speed recording respectively to determine the optimum strategy, the optimum recording power, and the optimum erasing power which are used to record the data with the recording and reproducing apparatus.

FIG. 4 schematically shows the recording and reproducing apparatus. The coefficient α of the erasing power, which is recorded on the disk, is read to calculate the erasing power Pb according to the, relational expression of $Pb = \alpha \times Pb1 + (1-\alpha) \times Pb2$. This calculation is performed by a Pb-calculating control unit 410. The information-recording and reproducing apparatus of the present invention has principally the same structure as the conventional recording apparatus (drive unit) for the ×2 speed recording or the ×3 speed recording except that the Pb-calculating control unit 410 is provided.

Next, a description will be made about a procedure to investigate the archival overwrite characteristic during the ×5 speed recording and the ×6 speed recording with the drive with Disk A and Disk B. At first, the random data is written ten times with the determined optimum power. The disk, on which the recording has been completed, is stored for 20 hours in an environment of 90° C. and 30% R.H., and then the disk is returned to room temperature to write the random data once at the same position. After that, the disk, on which the recording has been completed, is subjected to the ×2 speed reproduction of the recorded data with the reproducing power Pr=1 mW by using the information-recording and reproducing apparatus equipped with the optical recording medium as described above to investigate the archival overwrite jitter after the environmental test.

The following radial positions were used to perform the recording on the disk with the drive. That is, the recording was performed at positions of radiuses from 43.30 mm to 44.20 mm for the ×5 speed recording, and the recording was performed at positions of radiuses from 45.23 mm to 46.13 mm for the ×6 speed recording. When the jitter was investigated after the environmental test, then the reproduction jitter was investigated for every 5 tracks for the recording area, and an obtained average value was regarded as the archival overwrite jitter after the environmental test.

When the random data was written once with the drive after the environmental test, the drive was used to again perform the steps of determining the optimum strategy, the optimum recording power, and the optimum erasing power as described above. The optimum strategy, the optimum recording power, and the optimum erasing power, which were determined before and after the environmental test, were not changed.

Table 5 shows results of the investigation on the archival overwrite characteristics upon the ×5 speed recording and the ×6 speed recording with the drive by using Disk A and Disk B described above.

TABLE 5

| | Present value of α | | Archival overwrite jitter | |
|---|---|---|---|---|
| | ×5 speed recording | ×6 speed recording | ×5 speed recording | ×6 speed recording |
| Disk A | α = 0.50 | α = 0.50 | 11.5% | 12.7% |
| Disk B | α = 0.40 | α = 0.35 | 10.1% | 10.8% |

As appreciated from the results shown in Table 5 as well, when the high speed recording is performed by using the information-recording medium wherein the information α concerning the relationship among the value Pb1 which is larger than Pr and smaller than Pb, the value Pb2 which is larger than Pb and smaller than Pp, and Pb is recorded, it is possible to improve the archival overwrite characteristic for overwriting information after storing the medium for a certain period of time in the high temperature environment by setting α to have the appropriate value depending on the recording speed.

In the embodiment described above, the data is recorded on the land. However, the same or equivalent effect is obtained even when the recording is performed on the groove. In the embodiment of the present invention, the radial position of the recording is not specifically described. However, the same or equivalent effect is obtained at an arbitrary radius of 24 to 58 mm. In the embodiment of the present invention, the signal is reproduced at the linear velocity of 8.2 m/sec. However, the essential characteristic of the present invention is in the improvement in the high speed recording process. Therefore, the effect of the present invention can be obtained especially regardless of the speed or velocity of the reproduction.

The characteristic of the present invention is in the recording of the information in relation to the definition of the erasing power on the information-recording medium together with the information on the recording velocity in order to improve the archival overwrite characteristics in accordance with the realization of the high speed recording. The effect of the present invention can be obtained irrelevant to the structure or construction of the information-recording medium, the composition, the crystallization speed, the crystallization temperature, the crystal nucleus-generating temperature, and the melting point.

In the embodiment of the present invention, the threshold value is 13% in order to determine the values of Pb1 and Pb2 from the dependency of the erasing power on the jitter. However, the essential characteristic of the present invention is not affected by the threshold value of the jitter. The effect of the present invention is not lost even when an arbitrary threshold value is used to determine the values of Pb1 and Pb2, for example, from the dependency of the erasing power on the error rate and/or the dependency on the signal amplitude, S/N, or the asymmetry without using the jitter when the values of Pb1 and Pb2 are determined.

In this specification, the light beam for the recording is expressed as "laser beam". However, as for the present invention, the effect of the present invention is obtained with any energy beam provided that the energy beam is capable of changing the state of the information-recording portion of-the information-recording medium. Therefore, the effect of the present invention is not lost even when the energy beam such as an electron beam is used.

In the embodiment of the present invention, the red laser having the wavelength of 655 nm is used. However, the present invention is not especially affected by the wavelength of the laser. The effect is exhibited even in the case of any information-recording apparatus which uses a laser having a relatively short wavelength such as the blue laser and the ultraviolet laser and any information-recording medium used for such an information-recording apparatus.

In the embodiment of the present invention, the phase-change disk is used for the information-recording medium. However, the present invention is applicable to any information-recording medium provided that information is recorded on the information-recording medium by being irradiated with an energy beam. Therefore, the present invention is not especially affected by the material and the structure for constructing the information-recording medium and the shape of the information-recording medium. The present invention is also applicable to information-recording media such as optical cards other than the disk-shaped information-recording medium.

According to the information-recording method, the information-recording medium, and the information-recording apparatus of the present invention, it is possible to improve the overwrite characteristic in the high speed recording, especially the archival overwrite characteristic for overwriting information after retaining the medium in a high temperature environment for a certain period of time. Therefore, the present invention makes it possible to further improve the reliability of the large capacity high speed data recording irrelevant to the surrounding environment.

What is claimed is:

1. An information-recording medium for recording and reproducing information thereon, the information-recording medium comprising:
   an information-recording portion on which the information is recorded by being irradiated with a light beam having a recording power $Pp$ and an erasing power $Pb$ lower than the recording power $Pp$ and on which the information is reproduced by being irradiated with a light beam having a reproducing power $Pr$ lower than the erasing power $Pb$; and
   a control data portion, wherein:
   information for determining an optimum erasing power $Pb$ from a minimum erasing power $Pb1$ which satisfies $Pr<Pb1<Pb$ and a maximum erasing power $Pb2$ which satisfies $Pb<Pb2<Pp$ is previously recorded on the control data portion, and wherein the information for determining the optimum erasing power $Pb$ from $Pb1$ and $Pb2$ is $\alpha$, which is represented by an expression of $Pb=\alpha \times Pb1+(1-\alpha) \times Pb2$.

2. The information-recording medium according to claim 1, wherein a value of $\alpha$ satisfies $\alpha \leq 0.50$.

3. The information-recording medium according to claim 2, wherein the value of $\alpha$ satisfies $0.25 \leq \alpha \leq 0.50$.

4. An information-recording apparatus for recording information on an information-recording medium by radiating a light beam power-modulated to be at a recording power level and an erasing power level, the information-recording apparatus comprising:
   an optical head which radiates the light beam onto the information-recording medium;
   a driver which drives the optical head so that the light beam, which is power-modulated to be at the recording power level and the erasing power level, is outputted from the optical head; and
   a Pb-calculating control unit which reproduces a random pattern overwritten with light beams having a predetermined recording power and a variety of erasing powers to determine a minimum value $Pb1$ and a maximum value $Pb2$ of the erasing power obtained when the pattern with a reproduction jitter or a reproduction error exceeding a predetermined threshold value is erased, which reads a coefficient $\alpha$ which is used in an expression $Pb=\alpha \times Pb1+(1-\alpha) \times Pb2$ and has been previously recorded on the information-recording medium, and which determines an optimum erasing power $Pb$ to be used when the recording is performed, from the determined minimum value $Pb1$, the determined maximum value $Pb2$, and the read coefficient $\alpha$.

* * * * *